(12) United States Patent
Berti et al.

(10) Patent No.: US 9,580,174 B2
(45) Date of Patent: Feb. 28, 2017

(54) SEATING UNIT FOR TRANSPORTATION MEANS, IN PARTICULAR FOR AIRCRAFTS

(75) Inventors: Massimo Berti, Sezze Scalo (IT);
Andrea Giordano, Sezze Scalo (IT);
Alessio Morstcani, Sezze Scalo (IT);
Alessandro Braca, Sezze Scalo (IT)

(73) Assignee: OPTIMARES S.P.A., Sezze Scalo (LT) (IT)

( * ) Notice: Subject to any disclaimer, the term of this patent is extended or adjusted under 35 U.S.C. 154(b) by 22 days.

(21) Appl. No.: 14/122,633

(22) PCT Filed: May 16, 2012

(86) PCT No.: PCT/IT2012/000141
§ 371 (c)(1),
(2), (4) Date: Mar. 10, 2014

(87) PCT Pub. No.: WO2012/160581
PCT Pub. Date: Nov. 29, 2012

(65) Prior Publication Data
US 2014/0175849 A1    Jun. 26, 2014

(30) Foreign Application Priority Data

May 26, 2011   (IT) .............................. RM2011A0263
Nov. 25, 2011  (IT) .............................. RM2011A0624

(51) Int. Cl.
*B64D 11/06* (2006.01)
(52) U.S. Cl.
CPC ............ *B64D 11/06* (2013.01); *B64D 11/064* (2014.12)
(58) Field of Classification Search
CPC .............................. B64D 11/06; B64D 11/064
USPC ... 297/317, 337, 340, 344.15, 334.1, 344.11, 297/344.12, 344.13, 452.11, 34.1, 297/452.114
See application file for complete search history.

(56) References Cited

U.S. PATENT DOCUMENTS 3,572,829 A * 3/1971 Malitte ................ B64D 11/064
                                                297/317
5,058,954 A * 10/1991 Kan-Chee ...................... 297/317
5,112,109 A    5/1992 Takada
(Continued)

FOREIGN PATENT DOCUMENTS

DE    3943008 A1    7/1990
EP    1057725 A2    12/2000
JP    HOI I43948 U    10/1989

OTHER PUBLICATIONS

Information Disclosure Statement from Corresponding PCT Application PCT/IT2012/000141, Dated Sep. 13, 2012.

*Primary Examiner* — Syed A Islam
(74) *Attorney, Agent, or Firm* — Hedman & Costigan, P.C.; James V. Costigan; Kathleen A. Costigan (57) ABSTRACT

The present invention concerns a seating unit (1), in particular for aircrafts' economy class, comprising a substantially rigid fixed shell (4), a support structure (9), a backrest (2) and a seat (3), all contained within said shell (4), said seating unit (1) being characterized in that said backrest (2) and said seat (3) make a movement, substantially within said shell (4), between a retracted position, that is with said backrest (2) in a substantially vertical position and said seat (3) in a substantially horizontal position, and a slightly extended position, that is with said backrest (2) in a substantially slanted position and said seat (3) in a substantially slanted position, inclined downward.

18 Claims, 11 Drawing Sheets

(56) References Cited

U.S. PATENT DOCUMENTS

| | | | |
|---|---|---|---|
| 5,120,109 A * | 6/1992 | Rangoni | 297/284.3 |
| 2003/0025371 A1 | 2/2003 | Veneruso | |
| 2003/0111888 A1* | 6/2003 | Brennan | B60N 2/0284 |
| | | | 297/316 |
| 2004/0100137 A1* | 5/2004 | Johnson | 297/423.26 |

* cited by examiner

SEATING UNIT FOR TRANSPORTATION MEANS, IN PARTICULAR FOR AIRCRAFTS

The present invention relates to a seating unit for transportation means, in particular for aircrafts.

More specifically, the present invention relates to a reclinable seating unit for economy class, ensuring a better comfort to the passenger and at the same time occupying a reduced space, so as not to interfere with the body the passenger seated in the following row, and further realized to permit housing a higher number of seating units in the same vehicle.

According to the known technique, different arrangements are available for reclinable seating units for economy class.

Traditional seating units usually have a reclinable back, pivoted to the seat, said back, when in an extended position, i.e. with back reclined toward seating unit trunk, increases its volume with respect to the passenger seated in the following row. In fact, said solutions often caused problems for passenger seated in the rear seating unit either for reduction of front space and for sudden movement of the table, usually linked to the movement of the front seating unit back.

At present, said seating units are going to be replaced by seating units having a fixed back, thus permitting reducing space between a seating unit row and the following one, and also permitting providing a higher number of seating units in the same space.

There is a high push on the above requirements by the market, to arrange cabins of economy class. Transportation Company can thus permit transporting a higher number of passengers, without increasing dimensions of the vehicle, and mainly ensuring a sufficient comfort to the passenger. Thus, it is economically advantageous for Transportation Company, convenient for passenger for reduction of costs, but not advantageous under the comfort point of view.

Therefore, it is subject matter of the present invention that of providing a seating unit for transportation vehicles, having reduced sizes and at the same time permitting conforming to the comfort needing of passengers.

A further object of the present invention is that of preventing that passengers seated in a seating unit row can interfere with room space of the passenger seated on a seating unit of the following row.

It is subject matter of the present invention a seating unit, in particular for aircrafts' economy class, comprising a substantially rigid fixed shell, a support structure, backrest and a seat, all contained within said shell, said seating unit being characterized in that said backrest and said seat make a movement, substantially within said shell, between a retracted position, that is with said backrest in a substantially vertical position and said seat in a substantially horizontal position, and a slightly extended position, that is with said backrest in a substantially slanted position and said seat in a substantially slanted position, inclined downward.

Still according to the invention, the seating unit can comprise means to control the activation of said movement between said retracted position and said slightly extended position.

Always according to the invention, said backrest and said seat are arranged in order to cooperate to move between said retracted position and said slightly extended position.

Particularly, according to the invention, said backrest and said seat are constrained in rotation.

Furthermore, according to the invention, said shell can have, on both sides, has a first runner at the top of said backrest, a second runner in the inner part of said seat, and a third runner, in the outer part of said seat, said backrest having, on both sides, a first pin, in its upper part, to which it is constrained for rotation, said seat having, on both sides, a second pin, in its inner part, to which it is constrained for rotation, and a third pin, in its outer part, to which it is constrained for rotation, said first pin being linearly constrained to said first runner in order to slide in a substantially vertical direction, said second pin being linearly constrained to said second runner in order to slide in a substantially horizontal direction, and said third pin being linearly constrained to said third runner in order to slide in a substantially downward slanted direction.

Furthermore, according to the invention, said shell can have, on both sides, a first runner in the upper part of said backrest, a second runner in the inner part of said seat, said backrest having on both sides, a second pin in its inner part, to which it is constrained for rotation, said first pin being linearly constrained with said first runner in order to slide according to a substantially vertical direction, said second pin being linearly constrained in order to slide according to a substantially horizontal direction, an articulation lever being provided pivoted at a first end of said shell and at the second end on the lower part of said seat.

Still according to the invention, said first pin can be linearly constrained to said first runner to slide according to substantially vertical or slightly slanted direction, and/or said second pin can be linearly constrained to said second runner, to slide according to a substantially horizontal or slightly downward slanted direction.

Particularly, according to the invention, said third pin can be linearly constrained to said third runner, to slide according to a downward slanted direction.

Furthermore, according to the invention, said backrest can include a top part and a lower part separated each other, said top part and said lower part being constrained in rotation.

Always according to the invention, at the top of said backrest there is a headrest, integral to it.

Still according to the invention, said shell can comprise in the rear portion a monitor and/or a reclining table and/or a compartment provided on said reclining table.

Particularly, according to the invention, said seating unit can further comprise a pair of armrests, fixed to the lower portion of said shell.

Furthermore, according to the invention, said seating unit can comprise a front part constrained in rotation with said seat.

Always according to the invention, said seating unit can further comprise locking and unlocking means, and return means, said locking and unlocking means permitting locking said upper part when in a raised position, when said seating unit is a said retracted portion, said locking or unlocking means permitting unlocking said front part from said raised position making it freely rotating, when said seating unit passes from said retracted position to said slightly extended position, and said return means acting to bring said upper part back in the raised position.

Furthermore, according to the invention, said seating unit can be coupled with at least a further seating unit.

Still according to the invention, when combining two or more seating units, said support structure comprising at least two frames and a longitudinal element for all the seating units coupled with each frame of each seating units.

Furthermore according to the invention, when combining two or more seating units, said shell of each seating unit can have at least a lateral arm substantially extending close to the resting plane of the seating unit, and said support structure can have a first lower longitudinal element, extending all along the longitudinal extension of said seating unit assembly, and coupled with each arm, and at least two feet, coupled with said first longitudinal element, and a second upper longitudinal element, substantially under said seating unit, extending all along the longitudinal extension of the seating unit assembly, and coupled above each feet.

Furthermore, according to the invention, said shell of each outer seating unit of said seating unit assembly can have, laterally, in correspondence of outer sides of the seating unit assembly, an arm, substantially extending close to the resting plane of the seating unit, coupling with said first longitudinal element.

Still according to the invention, said seating unit can be coupled with two or more seating units.

Furthermore according to the invention, said shell of said at least a seating unit of the seating unit assembly can have laterally, on the part corresponding to the adjacent seating unit, a further arm, substantially extending close to the resting plane of the seating unit, coupling with said first longitudinal element.

Furthermore, it is subject matter of the present invention a seating system for transportation vehicles, particularly for economy class of airplanes, comprising at least two seating units and a support structure, each seating unit having a substantially rigid fixed shell, a back and a seat substantially contained within said shell, said seating system being characterized in that said shell of each outer seating unit of the system has, laterally, an arm, extending substantially close to the resting plane of the system, and in that said support structure comprises a first longitudinal lower element, extending all through the longitudinal extension of the system, and coupled with each arm, at least two feet, coupled with said first longitudinal upper element, substantially under said seat of each seating unit, extending all through the longitudinal extension of the system, and coupled above each foot.

Still according to the invention, said shell of each outer seating unit of said system can have, laterally, in correspondence of the outer sides of the system, an arm, substantially extending close to the resting plane of the system, coupling with said first longitudinal element.

Furthermore according to the invention, said system can comprise three or more seating units.

Finally, according to the invention, said shell of at least a seating unit of the system can have laterally, on the part in correspondence of the adjacent seating unit, a further arm extending substantially close to the resting plane of the system, coupling with said first longitudinal element.

The invention will be now described for illustrative but not limitative purposes with particular reference to preferred embodiments shown in the figures of the enclosed drawings, wherein.

Figure 1:
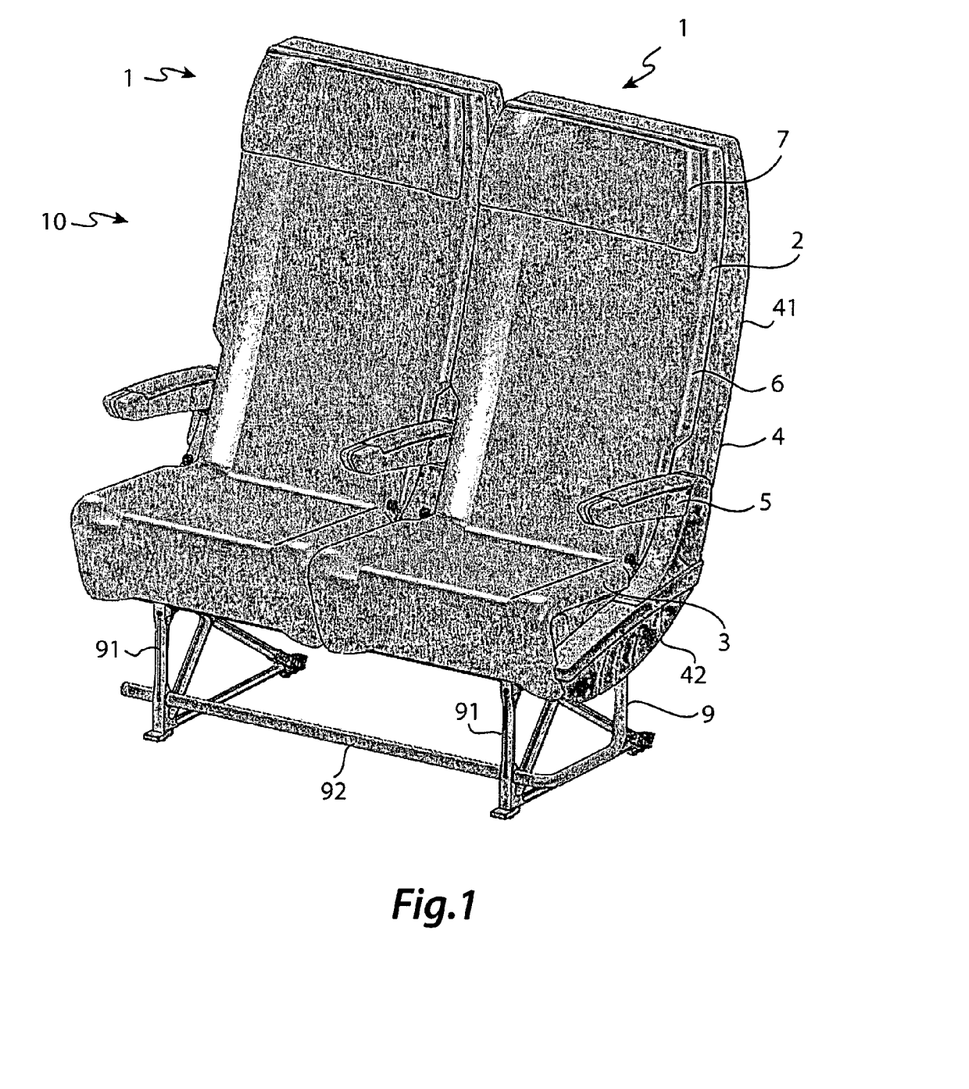
FIG. 1 shows a perspective front view of a pair of seating units in a retracted position, according to a first embodiment of the present invention.
Figure 2:
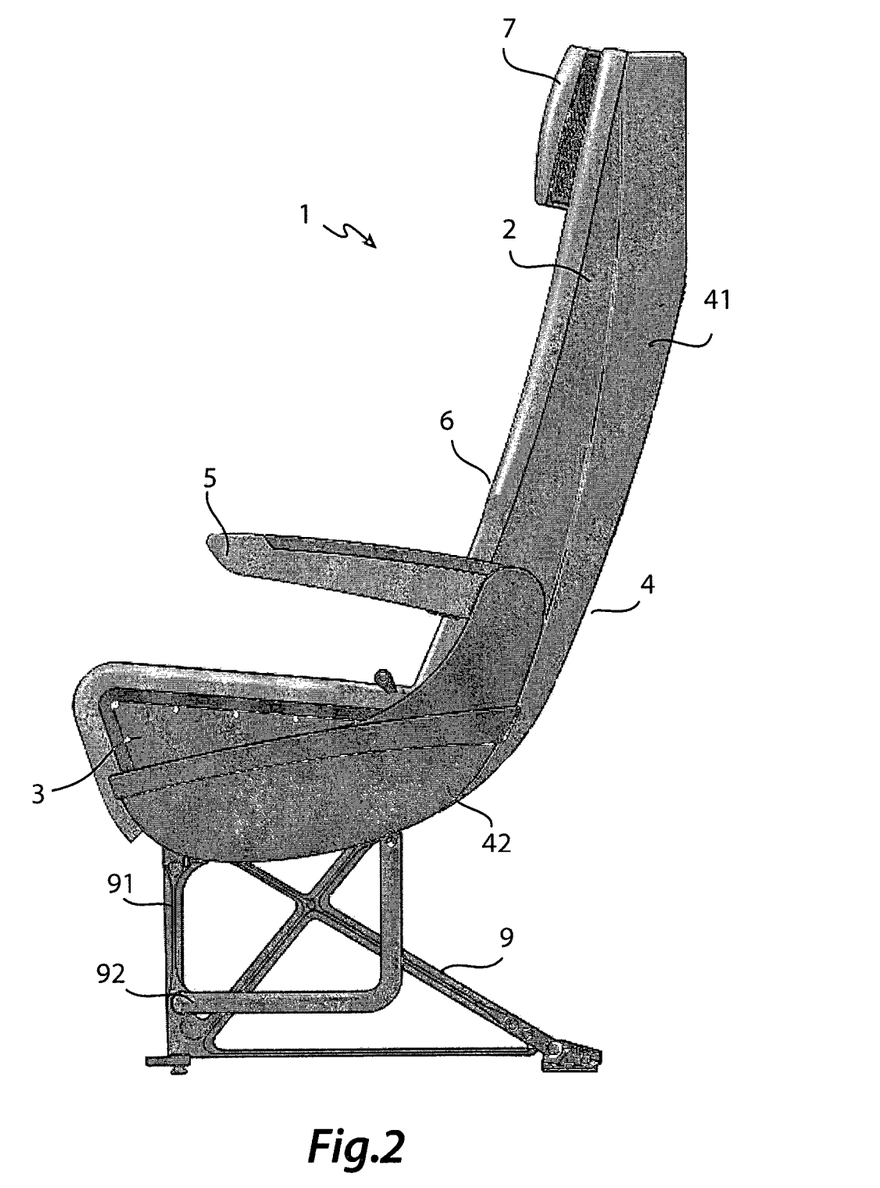
FIG. 2 is a lateral view of the pair of seating units of FIG. 1.

Making reference to FIGS. 1-2, it is observed a pair of seating units 1 according to a first embodiment of the invention, adjacent each other, thus realizing a seating unit 1 row 10.

Each seating unit 1 comprises:
  a backrest 2, reclinable between a substantially vertical position and a slightly slanted position, and vice versa;
  a seat 3, substantially perpendicular with respect to the backrest 2, when the latter is in a substantially vertical position, and that can move forward and slightly lower when the backrest 2 is moved to the slightly slanted position;
  a fixed shell 4, having a rear portion 41, coupled with the rear part of said backrest 2, and a lower portion 42, coupled with the lower portion of said seat 3;
  an armrest 5, coupled with the lower portion 42 of said shell 4;
  a cushion 6, fully covering the front part of the backrest 2, and the upper portion of the seat 3, conforming to the different positions of the seat 1, for a better comfort of passenger;
  a headrest 7, integrally fixed to the backrest 2, on the upper part 21 of the back rest 2, and above said cushion 6;
  control means (not shown in the figures) for controlling movement of backrest 2 and seat 3; and
  a support structure 9, on which seat 3, backrest 2 and shell 4 rest, and on which said control means are coupled.

Although support structure 9 can be realized according to different arrangements, and it can be realized to support one or more adjacent seating units 1, embodiment shown in the figure provides a support structure 9 comprising two frames 91, having a substantially trapezoidal shape, positioned at the free lateral end of the two adjacent seating units 1, and connected at the bottom by a longitudinal element 92, to obtain an improved stability of the support structure 9, and above at the seating unit 1 shells 4.

Figure 3:
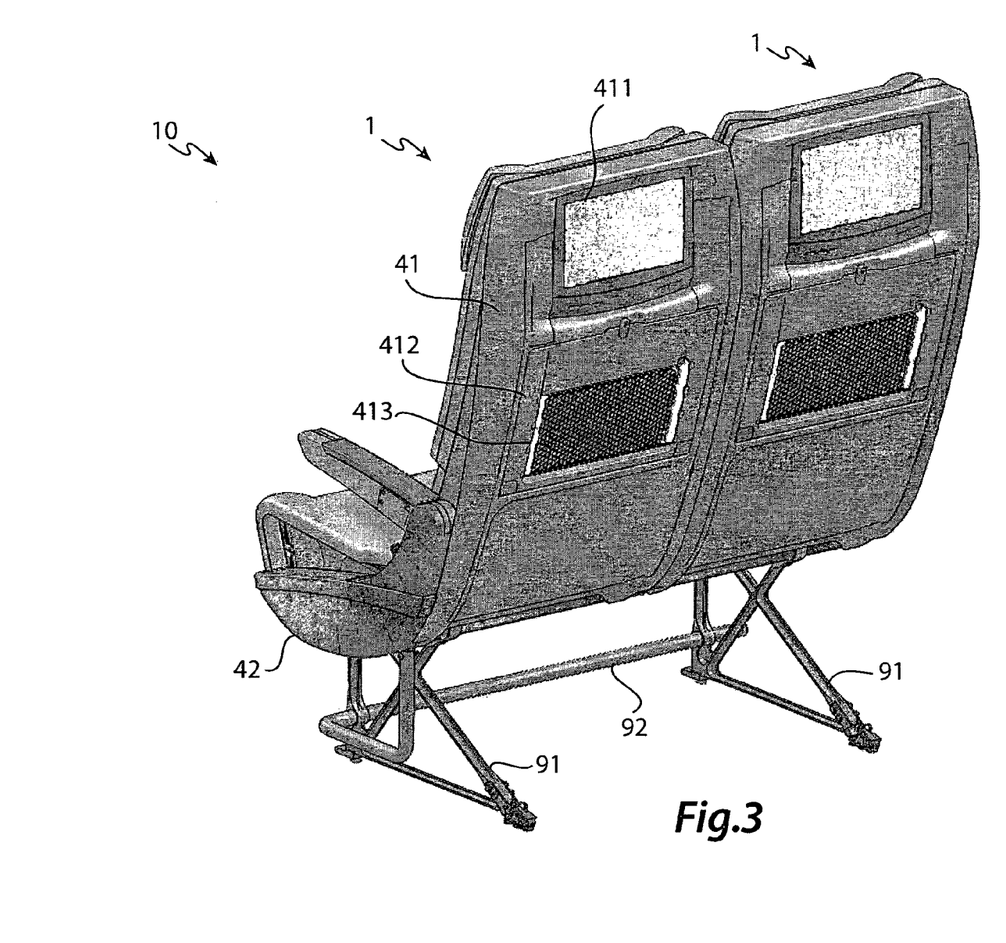
FIG. 3 shows a rear perspective view of the pair of seating units of FIG. 1.

Particularly, observing FIG. 3, it is observed that rear portion 41 of shell 4 has, within its volume, a monitor 411, provided in the upper part, and a reclinable table 412, provided with a compartment 413, both aimed to the passenger seated in the rear seating unit row.

Figure 4:
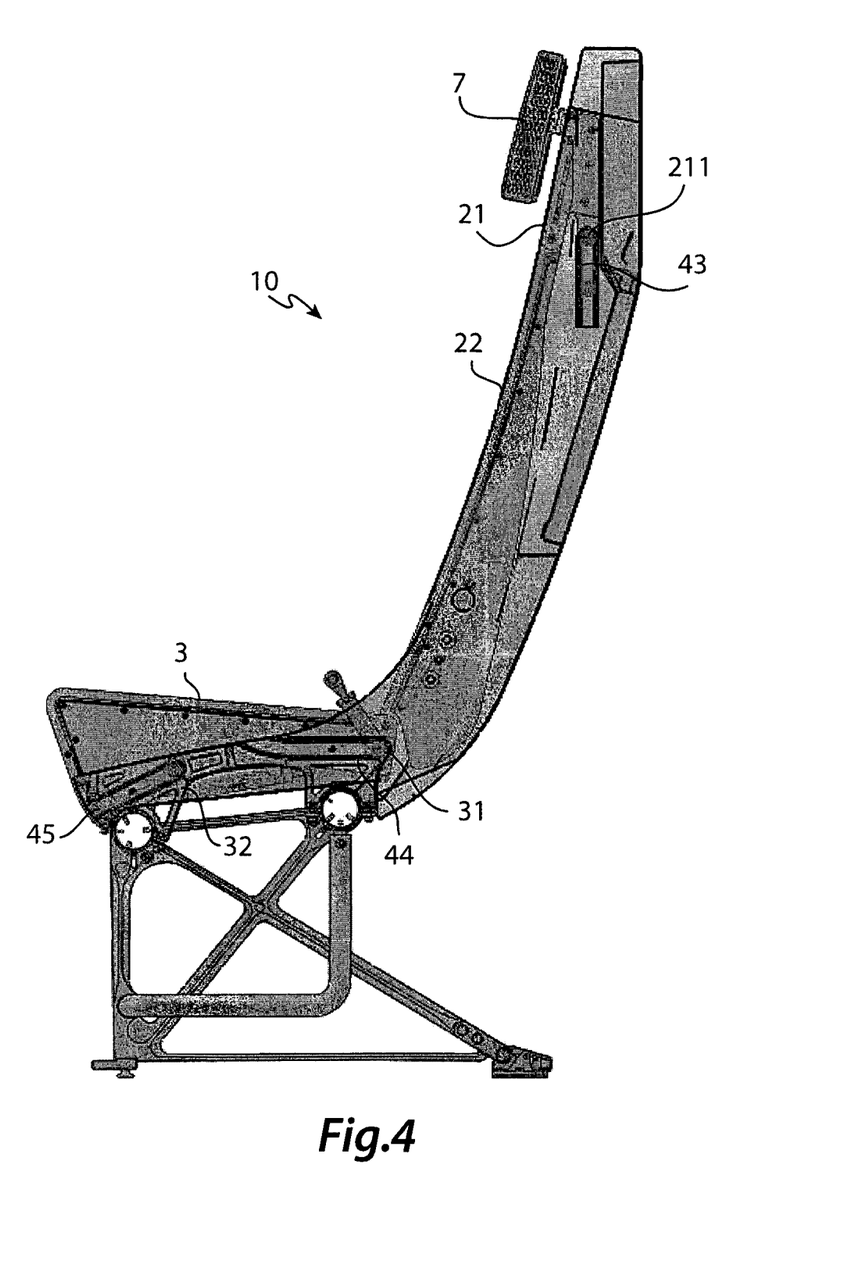
FIG. 4 shows a lateral section view of the pair of seating units of FIG. 1.

Making reference to FIG. 4, it is observed inner structure of seating unit 1, and operation of the mechanism permitting movement of backrest 2 and of seat 3.

Backrest 2 has two separated parts, and upper part 21, to which the headrest 7 is fixed, and a lower part 22, preferably four times longer that the upper part 21, and on which the passenger back is laid down. Particularly, upper part 21 of backrest 2 has, on both sides, a first pin 211, on which is restrained under rotation the upper part 21 of the back 2, sliding according to a vertical direction, along a first runner 43 fixed to the shell 4, in correspondence of the upper part 21 of said backrest 2.

Lower part 22 of backrest 2, is constrained in rotation both to the upper part 21 of the same, in correspondence of adjacent edges, either to the seat 3, in correspondence to the inner edge of seat 3 and to the lower edge of the backrest 2.

Seat 3 has, on both sides, a second pin 31, to which said seat 3 is constrained in rotation that can move along a horizontal direction, sliding along a second runner 44 fixed to the shell 4, in correspondence of the inner part of the seat 3.

Further, seat 3 has, on both sides, a third pin 32, to which said seat 3 is constrained in rotation, moving along a slightly slanted direction, slanted downward, sliding along a third runner 45 fixed to the shell 4, in correspondence of the outer part of seat 3.

Figure 5:
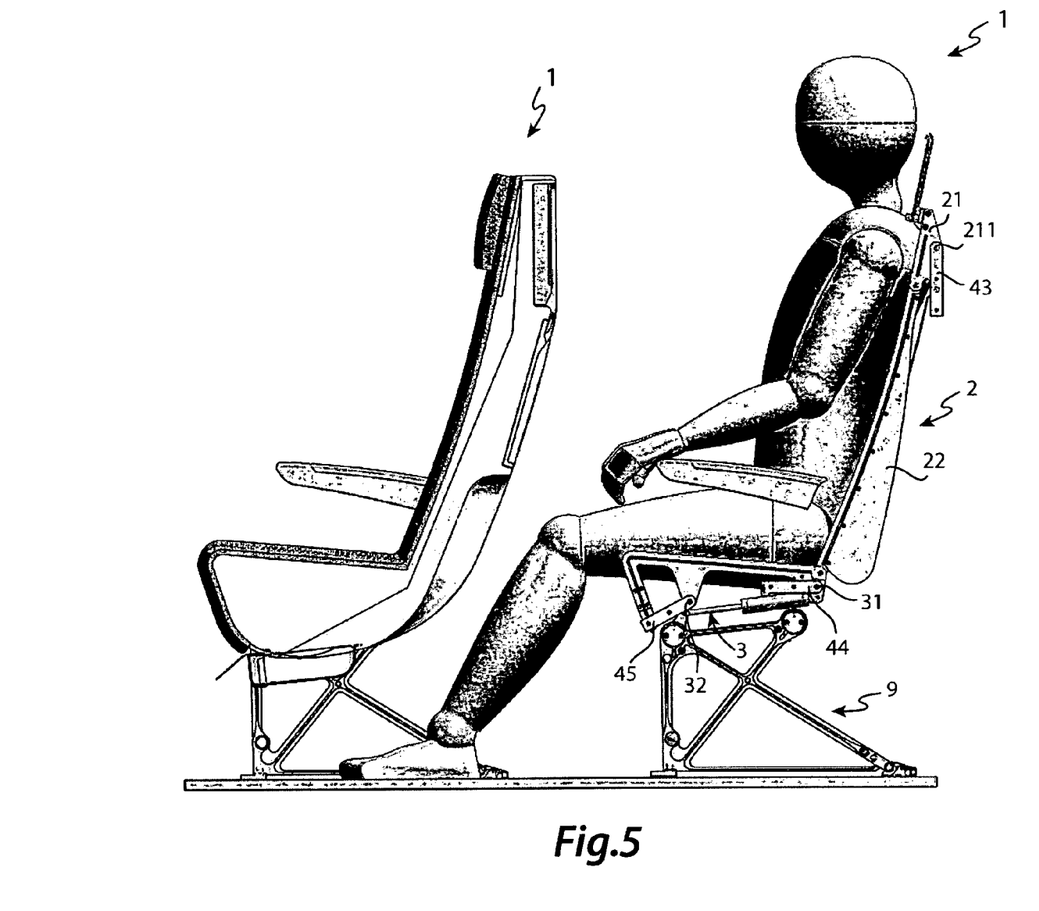
FIG. 5 shows a lateral view of the mechanism of the seating unit according to the invention in a retracted position.
Figure 6:
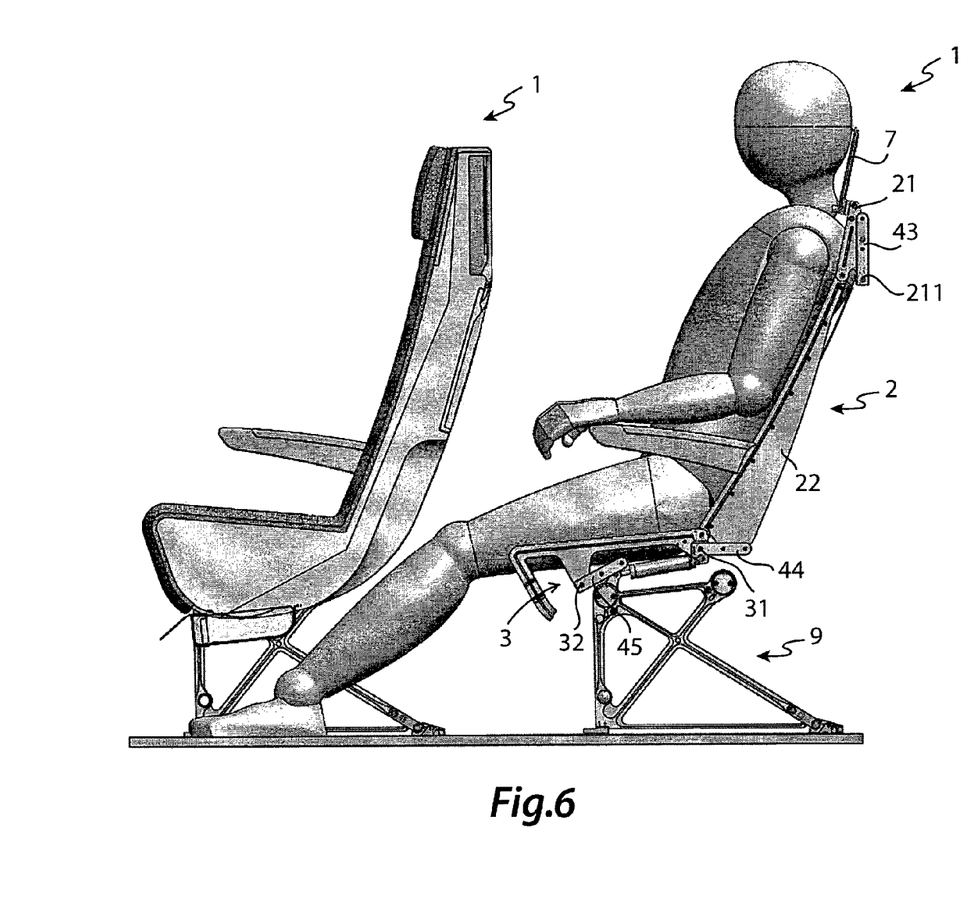
FIG. 6 shows a lateral view of mechanism of the seating unit according to the invention in a first embodiment, in a slightly extended position.

Seating unit 1 can be moved from a retracted position (as shown in FIG. 5), i.e. with back 2 in a substantially vertical position, and seat 3 in a substantially horizontal position, and a slightly extended position (as shown in FIG. 6), i.e. with back 2 in a substantially slanted position and seat 3 in a substantially downward slanted position.

Said movement occurs by operation of said control means, permitting to the seat 3 to move forward and slightly slant downward, sliding and rotating within said second 44 and third 45 runners provided on both sides of the shell 4. Advancement of seat 3 causes inclination of lower part 22 of backrest 2 and vertical sliding to upper part 23.

Figure 7:
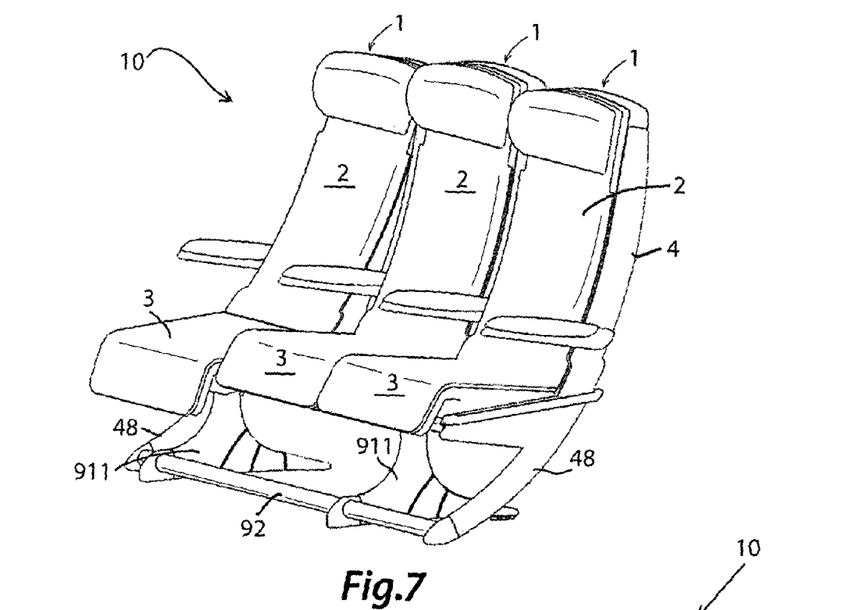
FIG. 7 shows a front perspective view of a row of three seating units, two in a retracted position and one in a slightly extended position, according to a second embodiment of the present invention.
Figure 8:
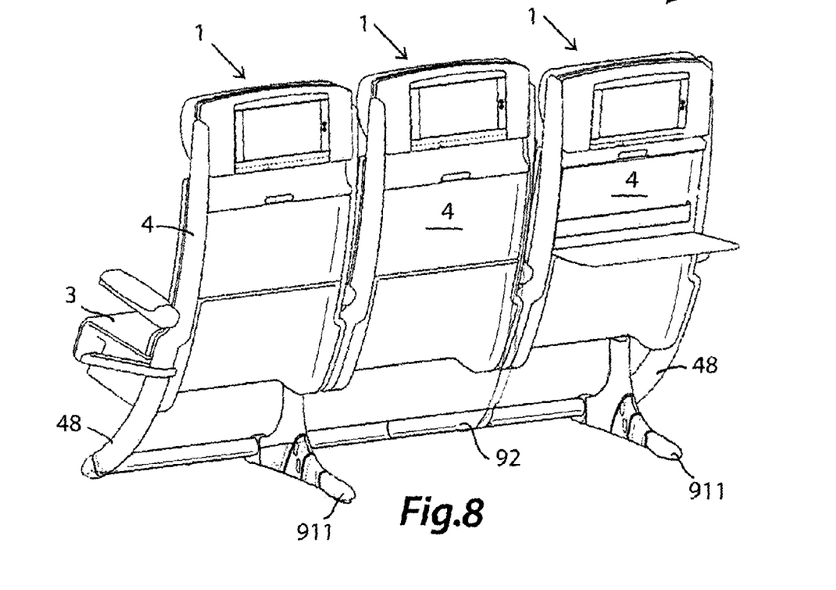
FIG. 8 shows a perspective rear view of the seating unit of FIG. 7.

From FIGS. 7 and 8 a row 10 of three seating units 1 according to the invention is observed, wherein parts similar or identical to the parts of the first embodiment described in the above are indicated by the same reference numbers, and will be no further described.

In embodiment represented in FIGS. 7 and 8, each seating unit 1 is supported by a support structure 9 comprising a first longitudinal element 92 positioned at the bottom and a second longitudinal element 33 position above, substantially under the seat 3. Both longitudinal elements 92 and 93 are common to all seating units 1 of said row 10 and extend all along longitudinal extension of row 10.

Furthermore, support structure 9 of the whole seating unit 1 row 10 provides two feet 911, coupled at the bottom with said first lower longitudinal element 92 and above said second upper longitudinal element 93, thus ensuring transmission of loads to both longitudinal elements 92 and 93.

Said support structure 9 is comprised of carbon fiber material, thus exploiting all its aesthetical and mechanical features.

Further, shell 4 of outer seating units of said row 10, comprised of carbon fiber material as well, has, laterally, in correspondence of the outer sides of the row 10, an arm 48, substantially extending downward, coupling with said first lower longitudinal element 92, thus helping supporting seating unit 1 row 10 (as shown in the figures).

Particularly, seating unit 1 row 10 represented in the figures is comprised of three adjacent seating units 1, supported by a first and a second longitudinal element 92, 93, two feet 911 and two arms 48, outside shell 4 of the outer seating units 1 in the row 10.

In further embodiments (not shown), seating unit row 10 can comprises two or more seating units 1 and also a higher number of feet 911 and of arms 48, to better distribute loads on the basis of the design needing for internal spaces of the vehicle, particularly an airplane.

It is well evident that combination of support structure and shell according to the present embodiment can be used in other seating unit types, independently from the sliding movement of backrest and seat.

Said combination has advantage of ensuring maximum space for every height of the man/woman, also ensuring an optimum load distribution.

Further, another advantage is that of increasing comfort space for passenger legs.

Figure 9A:
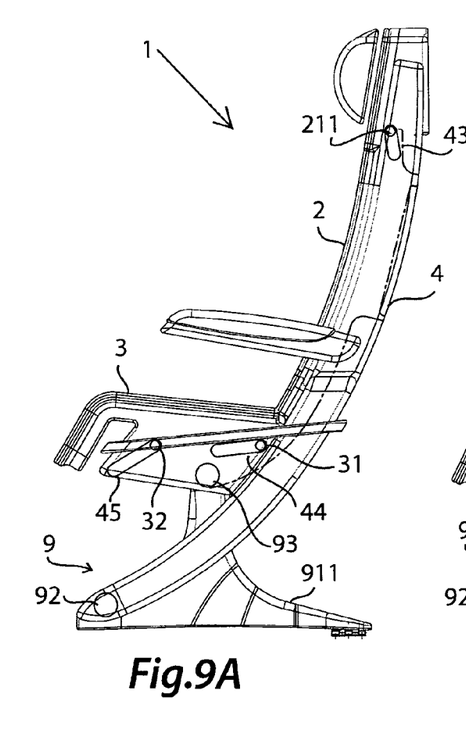
FIGS. 9A, 9B and 9C show a lateral view of the seating unit according to the invention according to the second embodiment in three different positions, i.e. retracted, intermediate and slightly extended positions.
Figure 9B:
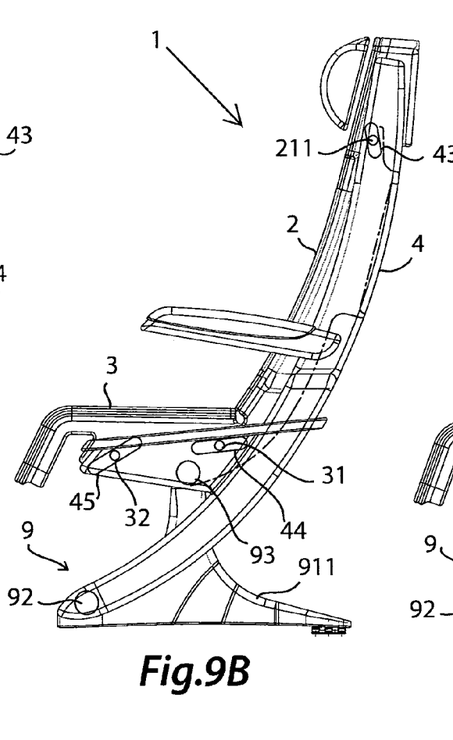
Figure 9C:
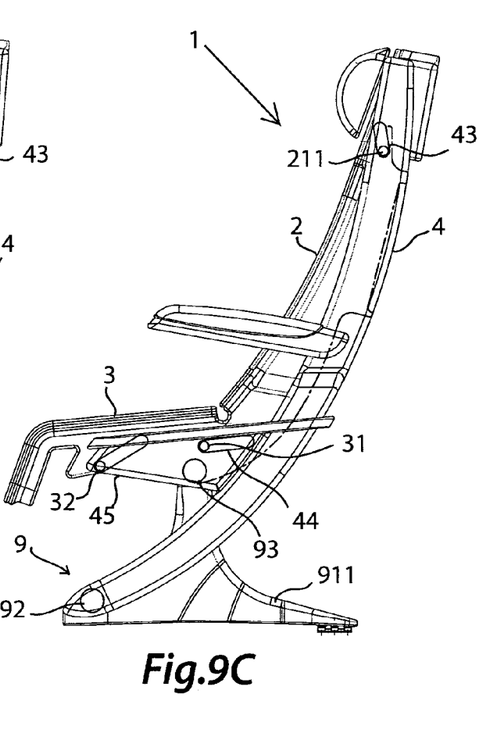

From FIGS. 9A, 9B and 9C, it is observed that seating unit 1 of said second embodiment can pass from a retracted position to a slightly extended position, and vice versa, by a sliding movement, on both sides of seating unit 1, seat 3 and backrest 2 substantially within the fixed shell 4.

In this embodiment, backrest 2 is comprised of a single element constrained in rotation to seat 3. Particularly, first pin 211 is provided on the upper part of both sides of backrest 2, sliding according to a slightly forward slanted direction, along first runner 43 fixed to the shell 4, in correspondence of the upper part of backrest 2. Headrest 7 is fixed to backrest 2, and it is integral with the same during movement between retracted position and slightly extended position, and vice versa.

Second pin 31, provided in correspondence of the inner part of seat 3, on both sides of the same, slides according to a slightly downward slanted direction, along first runner 43 fixed to the shell 4.

Finally, third pin 32, provided in correspondence of the front part of seat 3, on both sides of the same, slides according to a slightly downward slanted direction, along first runner 43 fixed to the shell 4.

Seating unit 1 can be moved from a retracted position (as shown in FIG. 9A), i.e. with backrest 2 in a substantially vertical position and seat 3 in a substantially horizontal position, and a slightly extended position (as shown in FIG. 9C), i.e. with backrest 2 in a substantially slanted position and seat 3 in a substantially downward slanted position.

Said movement occurs by operation of control means, permitting to the seat 3 to move forward and to slightly slant downward, sliding and rotating within second runner 44 and third runner 45, on both shell 4 sides. Forward movement of seat 3 causes slanting of backrest 2 and sliding of both shell 4 sides with respect to first runner 43.

Figure 11A:
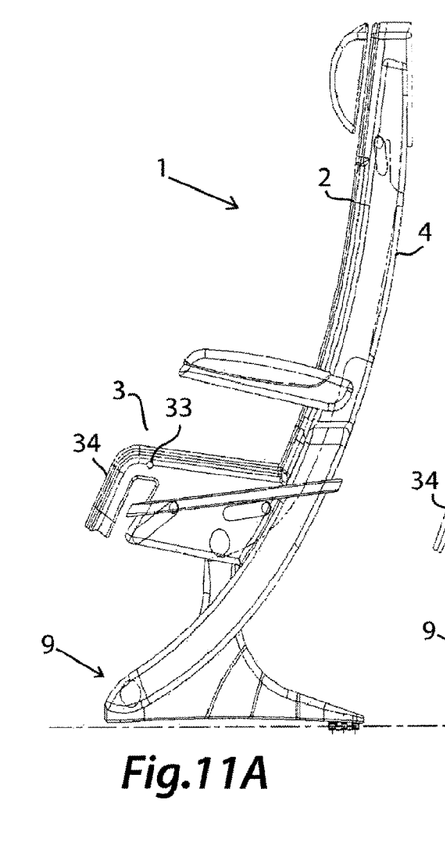
FIGS. 11A, 11B and 11C show a lateral view of the seating unit according to the invention according to the second embodiment in three different positions, i.e. retracted, intermediate and slightly extended positions, with a different seat arrangement.
Figures 11B, 11C:
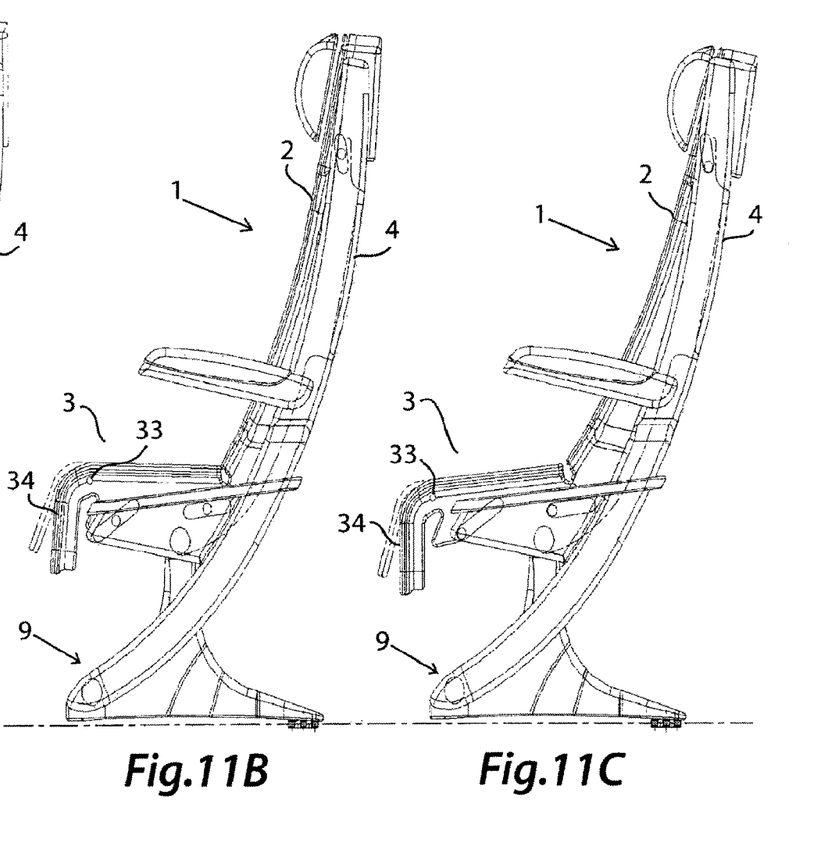

From FIGS. 11A, 11B and 11C it is observed a third embodiment of a seating unit 1 according to the invention, wherein parts similar or identical to the parts of the first embodiment described in the above are indicated by the same reference numbers, and will be no further described.

In this embodiment, seating unit 1 has the same features of the seating unit according to the second embodiment, but, in correspondence of the front part of said seat 3, instead having a ping-guide assembly, is provided, on both sides, with an articulation lever 8, having a first end 46 pivoted to said shell 4 and a second end 35 to the lower part of said seat 3.

Figure 10A:
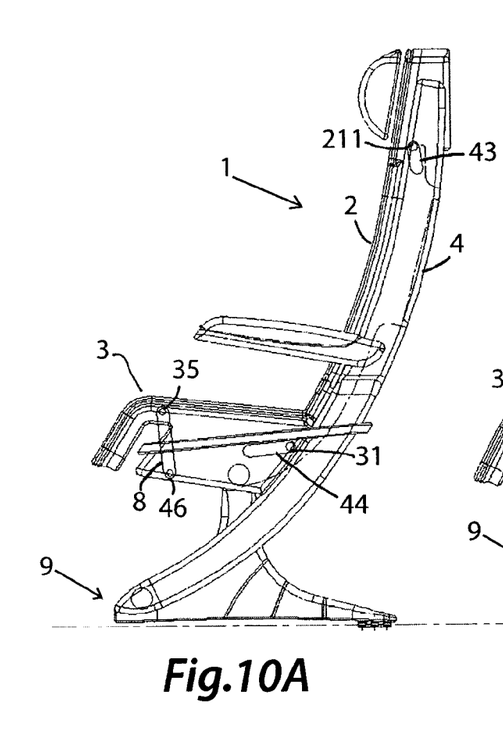
FIGS. 10A, 10B and 10C show a lateral view of the seating unit according to the invention according to the second embodiment in three different positions, i.e. retracted, intermediate and slightly extended positions.
Figures 10B, 10C:
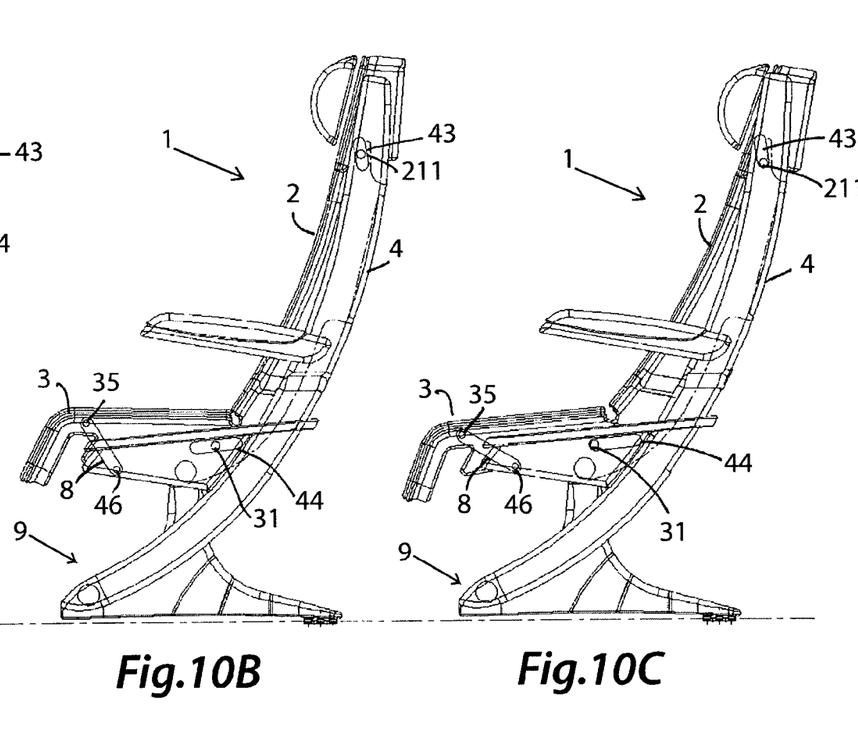

Seating unit 1 can be moved from a retracted position (as shown in FIG. 11A), i.e. with backrest 2 in a substantially vertical position and seat 3 in a substantially horizontal position, and a slightly extended position (as shown in FIG. 10C), i.e. with backrest 2 in a substantially slanted position and seat 3 in a substantially downward slanted position.

Said movement occurs by operation of control means, permitting to the seat moving forward and slightly inclining downward, sliding and rotating within second runner 44 on both shell 4 sides and rotating with respect to said articulation lever 8, provided on both seating unit 1 sides. Movement forward of said seat 3 causes slanting of backrest 2 and sliding with respect to the first runner 43 on both shell 4 sides.

Said reversible movement, provided in all the embodiments, permits to the passenger reclining seating unit according to its wishing, preventing legs are hindered by front row seating unit.

Another advantage is possibility of reclining seating unit without invading space of the rear seating unit of the rear row.

Further, another advantage is that of providing a convenient position to passengers but with a reduced space occupied with respect to the known seating units, permitting inserting a higher number of seating unit rows in the same vehicle.

From FIGS. 11A, 11B and 11C it is observed a seating unit according to the second embodiment of the invention, wherein seat 3 of said seating unit 1 has, in correspondence of its outer part, front part 34 separated and constrained in rotation to the same seat 3 by a fourth pin 33, provided on both side of said seat 3, provided with locking and unlocking means (not shown), connected with control means, and return means (not shown), preferably comprised of one or more springs. Particularly, when in the retracted position (as shown in FIG. 11A), said front part 34 of seat 3 is locked in a raised position, by said locking and unlocking means, to said seat 3.

When said control means are operated and said seating unit 1 starts passing from said retracted position to an intermediate position and then to a slightly extended position (as shown in FIGS. 11B and 11C), locking and unlocking means unlock front part 34 of said seat 3 with respect to the same seat 3, thus being free to rotate with respect to the seat in said fourth pin 33, on both sides of the seat 3. Return means operate to automatically bring said front part 34 back in the raised position with respect to the seat 3.

A user, such as a passenger, seated on said seating unit 1, when in the intermediate position or in the slightly extended position, can, by a light pressure of legs or by weight of the same legs, lower said front part 34 of the seat 3, opposing to the return means force, according to his/her needing.

Said configuration of the seat could be also provided in other embodiments, without being necessarily constrained to the sliding movement of the backrest with respect to the seat.

Figure 12A:
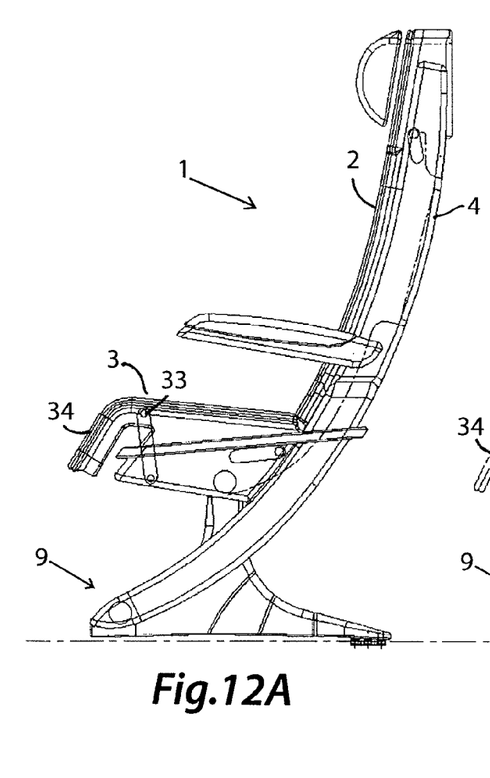
FIGS. 12A, 12B and 12C show a lateral view of the seating unit according to the invention according to the third embodiment in three different positions, i.e. retracted, intermediate and slightly extended positions, with a different seat arrangement.
Figure 12B:
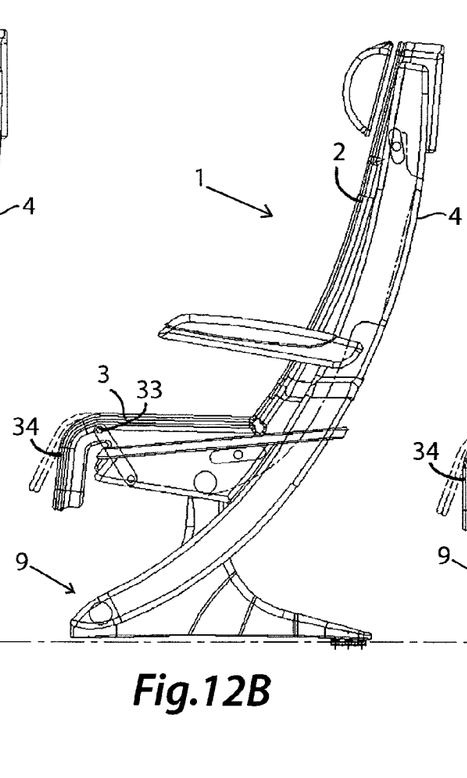
Figure 12C:
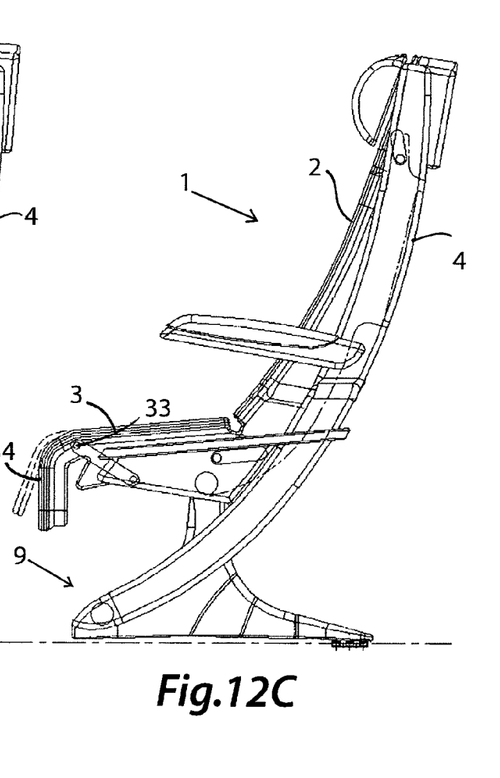

The above is shown in FIGS. 12A, 12B and 12C, wherein it is shown the third embodiment of the present invention, with the above configuration.

Said solution advantageously permits improving passenger comfort on the basis of the seating unit position.

Preferred embodiments of the present invention have been described in the above, but it is understood that those skilled in the art can introduce modification and changes to the same without departing from the relevant scope as defined in the enclosed claims.

The invention claimed is:

1. Seating unit (1), in particular for aircrafts' economy class, comprising a substantially rigid fixed shell (4) having a rear portion(41) and a lower portion (42), a support structure (9), a backrest (2) having an upper part (21) and a lower part (22), a headrest portion (7) arranged on said upper part (21) of said backrest (2), and a seat (3) constrained in rotation to said lower part (22) of said back rest (2), said backrest (2) and said seat (3) being contained within said shell (4), said seating unit (1) being characterized in that said backrest (2) and said seat (3) make a movement, substantially within said shell (4) without invading the space of a rear seating unit of a rear row, between a retracted position, that is with said backrest (2) in a substantially vertical position and said seat (3) in a substantially horizontal position, and a slightly extended position, that is with said backrest (2) in a substantially slanted position and said seat (3) in a substantially slanted position, with the front part of said seat (3) inclined downward according to a forward direction and wherein said fixed shell (4) has, on both sides, a first runner (43) arranged on said rear portion (41) in correspondence of the upper part (21) of said backrest (2) close to said headrest portion (7), a second runner (44) a arranged on said lower portion (42) in correspondence of the inner part of said seat (3), said backrest (2) has, on both sides, a first pin (211) in its upper part 21, linearly constrained to said first runner (43) of said fixed shell (4) in order to slide in a substantially vertical direction, said seat (3) has, on both sides, a second pin (31), in its inner part, linearly constrained to said second runner (44) in order to slide in a substantially horizontal direction, said seat (3) has, on both sides, a third pin (32,35), in its front part, coupled to said fixed shell (4) in order to move said seat (3) in a substantially downward slanted direction, said seating unit (1) being configured so that when said seating unit (1) moves from said retracted position to said slightly extended position, said first pin (211) of said backrest (2) slides downward in a substantially vertical direction, said second pin (31) of said seat (3) slides forward in a substantially horizontal direction and said third pin (32,35) of said seat (3) moves forward in a substantially downward slanted direction.

2. Seating unit (1) according to claim 1, characterized in that it further comprises means to control the activation of said movement between said retracted position and said slightly extended position.

3. Seating unit (1) according to claim 1, characterized in that said backrest (2) and said seat (3) are arranged in such a way to cooperate to move between said retracted position and said slightly extended position.

4. Seating unit (1) according to claim 1, characterized in that said shell (4) has an articulation lever (8) is provided which is pivoted at a first end (46) of said shell (4) and at the second end (35) on the lower t of said seat (3).

5. Seating unit (1) according to claim 1, characterized in that said third pin (32) is linearly constrained to said third runner (45), to slide according to a downward slanted direction.

6. Seating unit (1) according to claim 1, characterized in that said backrest (2) includes a top part (21) and a lower part (22), separated from each other, said top part (21) and said lower part (22) being constrained in rotation.

7. Seating unit (1) according to claim 1, characterized in that at the top of said backrest (2) there is a headrest (7), integral to it.

8. Seating unit (1) according to claim 1, characterized in that said shell (4) comprises in the rear portion a reclining table (412) and a container net (413) provided on said reclining table (412) and a monitor (411).

9. Seating unit (1) according to claim 1, characterized in that it further comprises a pair of armrests (5), fixed to the lower portion of said shell (4).

10. Seating unit (1) according to claim 1, characterized in that said seat (3) comprises, in correspondence of its outer part, a front part (34) constrained in rotation with said seat (3).

11. Seating unit (1) according to claim 10, characterized in that said seat (3) further comprise locking and unlocking means, and return means, said locking and unlocking means permitting locking said front part (34) when in a raised position, when said seating unit (1) is in said retracted portion, said locking or unlocking means permitting unlocking said front part (34) from said raised position making it freely rotating, when said seating unit passes from said retracted position to said slightly extended position, and said return means acting to bring said upper part (34) back in the raised position.

12. Seating unit (1) according to claim 1, characterized in that it is coupled with at least a further seating unit (1).

13. Seating unit (1) according to claim 1, characterized in that, when combining two or more seating units, said support structure (9) comprising at least two frames (91) and a longitudinal element (92) for all the seating units (1) coupled with each frame (91) of each seating unit (1).

14. Seating unit (1) according to claim 12, characterized in that when combining two or more seating units, said shell (4) of each seating unit (1) has at least a lateral arm (48) substantially extending close to the resting plane of the seating unit (1), and said support structure (9) has a first lower longitudinal element (92), extending all along the longitudinal extension of said seating unit (1) assembly, and coupled with each arm (48), and at least two feet (911), coupled with said first longitudinal element (92), and a second upper longitudinal element (93), substantially under said seat (3), extending all along the longitudinal extension of the seating unit (1) assembly, and coupled above each feet (911).

15. Seating unit (1) according to claim 14, characterized in that said shell (4) of each outer seating unit (1) of said seating unit (1) assembly has, laterally, in correspondence of outer sides of the seating unit (1) assembly, an arm (48), substantially extending close to the resting plane of the seating unit (1), coupling with said first longitudinal element (92).

16. Seating unit (1) according to claim 14, characterized in that it is coupled with two or more seating units (1).

17. Seating unit (1) according to claim 1, characterized in that said shell (4) of said at least a seating unit (1) of the seating unit (1) assembly has laterally, on the part corresponding to the adjacent seating unit (1), a further arm, substantially extending close to the resting plane of the seating unit (1), coupling with said first longitudinal element (92).

18. Seating unit (1) according to claim 1, characterized in that said shell (4) comprises in the rear portion a reclining table (412) and a container net (413) provided on said reclining table (412) or a monitor (411).

* * * * *